(12) United States Patent  (10) Patent No.: US 12,444,804 B2
Yano et al.  (45) Date of Patent: Oct. 14, 2025

(54) BATTERY MODULE, AND ELECTRIC VEHICLE AND POWER STORAGE DEVICE EQUIPPED WITH BATTERY MODULE

(71) Applicant: SANYO Electric Co., Ltd., Osaka (JP)

(72) Inventors: Junya Yano, Hyogo (JP); Tomonori Kunimitsu, Hyogo (JP); Masato Nakayama, Hyogo (JP); Taisuke Hamada, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 528 days.

(21) Appl. No.: 17/906,355

(22) PCT Filed: Nov. 19, 2020

(86) PCT No.: PCT/JP2020/043107
§ 371 (c)(1),
(2) Date: Sep. 15, 2022

(87) PCT Pub. No.: WO2021/199489
PCT Pub. Date: Oct. 7, 2021

(65) Prior Publication Data
US 2023/0143369 A1    May 11, 2023

(30) Foreign Application Priority Data
Mar. 30, 2020 (JP) .................................. 2020-061480

(51) Int. Cl.
*B60K 1/04* (2019.01)
*B60L 53/60* (2019.01)
(Continued)

(52) U.S. Cl.
CPC ........... *H01M 50/284* (2021.01); *B60L 53/60* (2019.02); *H01M 10/482* (2013.01);
(Continued)

(58) Field of Classification Search
CPC . B60K 1/02; B60K 2001/0438; H01M 50/50; H01M 50/209; H01M 10/482;
(Continued)

(56) References Cited

U.S. PATENT DOCUMENTS 11,128,018 B2 * 9/2021 Makino .................. H05K 1/118
11,628,728 B2 * 4/2023 Dulle ...................... B60R 16/03
324/426
(Continued)

FOREIGN PATENT DOCUMENTS

CN 102308433 A 1/2012
CN 110718661 A 1/2020
(Continued)

OTHER PUBLICATIONS

English Translation of Chinese Search Report dated Nov. 6, 2023 for the related Chinese Patent Application No. 202080096540.8. (2 pages).
(Continued)

*Primary Examiner* — Jason D Shanske
*Assistant Examiner* — James J Triggs
(74) *Attorney, Agent, or Firm* — WHDA, LLP

(57) ABSTRACT

In a battery module, end plates disposed at both ends of battery stack are connected by binding bars. Electrode terminals of respective battery cells and voltage detection circuit of electronic circuit block are connected by a plurality of voltage detection lines. Electronic circuit block is disposed on an outer surface of end plate and fixes one connector formed by linearly disposing a plurality of connecting terminals to which voltage detection lines are connected to circuit board on which voltage detection circuit is mounted. Voltage detection circuit is provided with a plurality of input terminals arranged in a linear manner. In circuit board, connecting terminal and input terminal dis-
(Continued)

posed at opposite positions are connected by a plurality of connection lines. A cell voltage of each battery cell is input from connection line to adjacent input terminals.

12 Claims, 13 Drawing Sheets

(51) Int. Cl.
*H01M 10/48* (2006.01)
*H01M 50/209* (2021.01)
*H01M 50/284* (2021.01)
*H01M 50/298* (2021.01)
*H01M 50/512* (2021.01)

(52) U.S. Cl.
CPC ....... *H01M 50/209* (2021.01); *H01M 50/298* (2021.01); *H01M 50/512* (2021.01); *H01M 2220/20* (2013.01)

(58) Field of Classification Search
CPC ..... H01M 2220/20; H01M 2010/4271; H01M 50/248; H01M 50/284; B60L 58/21; B60L 53/60
See application file for complete search history.

(56) References Cited

U.S. PATENT DOCUMENTS

| | | | | |
|---|---|---|---|---|
| 2009/0139781 A1* | 6/2009 | Straubel | ................ | B60L 53/14 |
| | | | | 701/22 |
| 2011/0076521 A1* | 3/2011 | Shimizu | ............ | H01M 50/529 |
| | | | | 429/82 |
| 2012/0019061 A1 | 1/2012 | Nishihara et al. | | |
| 2012/0057316 A1* | 3/2012 | Kaneshige | .......... | H01M 50/213 |
| | | | | 361/752 |
| 2012/0313559 A1 | 12/2012 | Tonomura et al. | | |
| 2014/0363711 A1* | 12/2014 | Zhao | ................... | H01M 50/569 |
| | | | | 429/90 |
| 2015/0125720 A1* | 5/2015 | Fujii | ................... | H01M 50/209 |
| | | | | 429/56 |
| 2015/0137824 A1 | 5/2015 | Nishihara | | |
| 2015/0144409 A1* | 5/2015 | Fujii | ................... | H01M 50/519 |
| | | | | 429/121 |
| 2015/0243947 A1* | 8/2015 | Seto | ................... | H01M 50/522 |
| | | | | 429/158 |
| 2017/0305248 A1* | 10/2017 | Hara | ........................ | B60K 1/04 |
| 2020/0020919 A1 | 1/2020 | Makino | | |
| 2022/0320600 A1* | 10/2022 | Yano | ................... | H01M 50/358 |
| 2023/0143369 A1* | 5/2023 | Yano | ................... | H01M 50/284 |
| | | | | 180/68.5 |

FOREIGN PATENT DOCUMENTS

| | | |
|---|---|---|
| JP | 2012-054025 | 3/2012 |
| JP | 2012-256521 | 12/2012 |
| JP | 2020-013829 | 1/2020 |
| WO | 2010/113455 | 10/2010 |
| WO | 2014/024452 | 2/2014 |
| WO | 2015/052801 | 4/2015 |

OTHER PUBLICATIONS

International Search Report of PCT application No. PCT/JP2020/043107 dated Feb. 9, 2021.

* cited by examiner

BATTERY MODULE, AND ELECTRIC VEHICLE AND POWER STORAGE DEVICE EQUIPPED WITH BATTERY MODULE

CROSS-REFERENCE TO RELATED APPLICATIONS

This application is a U.S. national stage application of the PCT International Application No. PCT/JP2020/043107 filed on Nov. 19, 2020, which claims the benefit of foreign priority of Japanese patent application No. 2020-061480 filed on Mar. 30, 2020, the contents all of which are incorporated herein by reference.

TECHNICAL FIELD

The present invention relates to a battery module in which a plurality of battery cells are connected, and an electric vehicle and a power storage device that include the battery module. In particular, the present invention relates to a battery module that supplies power to a motor that is mounted on an electric vehicle such as a hybrid automobile, an electric automobile, a fuel cell automobile, and an electric motorcycle and causes the vehicle to travel, or a battery module for large current that is used for home and factory power storage applications, and an electric vehicle and a power storage device that include the battery module.

In the present description, the term "battery module" is used in a broad sense including all battery modules in which a pair of end plates are disposed on both end surfaces of a plurality of battery cells and the end plates are coupled with a binding bar, and including a voltage detection circuit that detects a voltage of a battery cell. Examples of the battery module include a "battery pack" that does not incorporate a controlling circuit such as a charge and discharge controlling circuit which controls charge and discharge electric current.

BACKGROUND ART

A battery module including a plurality of battery cells is used for a power source for a vehicle such as a hybrid automobile or an electric automobile, a power source of a power storage system for a factory, a home, and the like (e.g., refer to PTL 1).

An example of such a battery module is shown in an exploded perspective view of FIG. 14. In battery module 900 shown in this figure, a plurality of battery cells 901 are stacked to make battery stack 902, end plates 903 are disposed on both end surfaces of this battery stack 902, and the pair of end plates 903 are fastened by binding bars 904 to fix battery cells 901. In each battery cell 901, a pair of positive and negative-electrode terminals 911 are disposed on an upper surface of terminal surface 910. Positive and negative-electrode terminals 911 are electrically connected via bus bar 914 to connect battery cells 901 in series or in parallel.

Circuit board 906 connected to each battery cell 901 is disposed on an upper surface of battery stack 902. A voltage detection circuit that detects a voltage of battery cells 901 is mounted on circuit board 906 so that battery cells 901 can be charged and discharged while being protected.

CITATION LIST

Patent Literature

PTL 1: WO 2014/024452 A

SUMMARY OF THE INVENTION

The above battery module has a disadvantage that the entire battery module is high because the circuit board is disposed on the battery stack. In order to solve this disadvantage, the inventors of the present invention have solved the problem by moving the circuit board from above the battery stack to the surface of the end plate. However, the battery module in which the circuit board is disposed on the surface of the end plate has a disadvantage that the wiring pattern of the circuit board becomes complicated. This is because voltage detection lines are disposed on both sides of the battery stack, and the cell voltage of each battery cell is input to both sides of the circuit board through separate connectors. In this battery module, voltages of respective battery cells are input from separate connectors disposed on both sides of the circuit board, and voltages of a large number of battery cells are sequentially input to both sides of the circuit board. Although the cell voltages input from the separate connectors arranged on both sides are input to the voltage detection circuit via the wiring pattern of the circuit board, this circuit board has a disadvantage that the wiring pattern becomes complicated.

The present invention has been developed to further prevent the above adverse effects, and an object of the present invention is to provide a technique for realizing high reliability and safety by simplifying a wiring pattern of a circuit board while reducing a height of a battery module.

A battery module according to an aspect of the present invention includes: a battery stack formed by stacking a plurality of battery cells; a pair of end plates disposed at both ends in a stacking direction of the battery stack; a binding bar formed by connecting the end plates; an electronic circuit block including a voltage detection circuit that detects a voltage of each of the plurality of battery cells; and a plurality of voltage detection lines formed by connecting positive and negative-electrode terminals of the each of the plurality of battery cells and the electronic circuit block. The each of the plurality battery cells has a terminal surface formed by disposing the positive and negative-electrode terminals at both ends, and the battery stack is a stacked body formed by laminating the plurality of battery cells with the terminal surface on the same plane. The electronic circuit block is disposed on an outer surface of each of the end plates and includes a circuit board on which a voltage detection circuit is mounted. In the circuit board, one connector formed by linearly disposing a plurality of connecting terminals formed by connecting voltage detection lines is fixed. In the voltage detection circuit, a plurality of input terminals having adjacent input terminals as input terminals of cell voltages of the battery cells are arranged in a linear manner. In the circuit board, the plurality of connecting terminals and the plurality of input terminals are disposed at opposing positions. The plurality of connecting terminals and the plurality of input terminals at the opposing positions are connected by a plurality of rows of connection lines. The cell voltage of the each of the plurality of battery cells is input to corresponding one of the plurality of connecting terminals connected to corresponding one of the plurality of input terminals by corresponding one of the plurality of connection lines.

An electric vehicle according to an aspect of the present invention includes: the above-described the power supply device; a motor for traveling to which electric power is supplied from the power supply device; a vehicle body on which the power supply device and the motor are mounted; and wheels driven by the motor to cause the vehicle body to travel.

A power storage device according to an aspect of the present invention includes the above power supply device, and a power supply controller that controls charging and discharging of the power supply device. The power supply controller enables charging of the plurality of stacked battery cells with electric power from outside and controls the charging of the plurality of stacked battery cells.

The battery module described above protects the electronic circuit block including the voltage detection circuit from high-temperature, high-pressure exhaust gas to achieve high safety while reducing height, and can efficiently dissipate heat from the electronic circuit block.

DESCRIPTION OF EMBODIMENT

First, a subject that the inventors of the present invention focus on will be described. A battery module includes an electronic circuit block including a voltage detection circuit that detects a voltage of each battery cell in order to prevent overcharge and overdischarge of each battery cell. The voltage detection circuit provided in the electronic circuit block is connected to an electrode terminal of a battery cell via a voltage detection line to detect a voltage of each battery cell. The electronic circuit block can be disposed on the upper surface of the battery stack to shorten the voltage detection line, but the battery module having this structure has an adverse effect that high-temperature and high-pressure exhaust gas ejected from the battery cell causes thermal damage to the electronic circuit block.

Further, although it is desired to downsize the entire battery module in almost no exception in all applications, the battery module in which the electronic circuit block is disposed on the battery stack has a disadvantage that the overall height becomes high. The battery module is required to have high performance by increasing a charge/discharge capacity with respect to a unit volume, but it is difficult to reduce the entire battery module in which an electronic circuit block is disposed on a battery stack. Specifically, examples of the component disposed on the upper surface of the battery stack include a gas duct for discharging exhaust gas, an electrode terminal protruding from a terminal surface, a bus bar of a metal sheet for connecting adjacent electrode terminals, and an insulating material for insulating the component from the high-voltage battery stack. However, since most of these components are disposed so as not to interfere with each other, it is difficult to lower the overall height of the battery module in which the electronic circuit block is further disposed.

Thinning the electronic circuit block disposed on the upper surface of the battery stack is effective in reducing the overall height, but it is difficult to dissipate heat energy of the heat generating component mounted on the electronic circuit block. Since a heat generating component such as a semiconductor element or a discharge resistor is mounted on the electronic circuit block, it is extremely important to efficiently dissipate heat energy to lower a temperature rise of the heat generating component below a set temperature.

Figure 12:
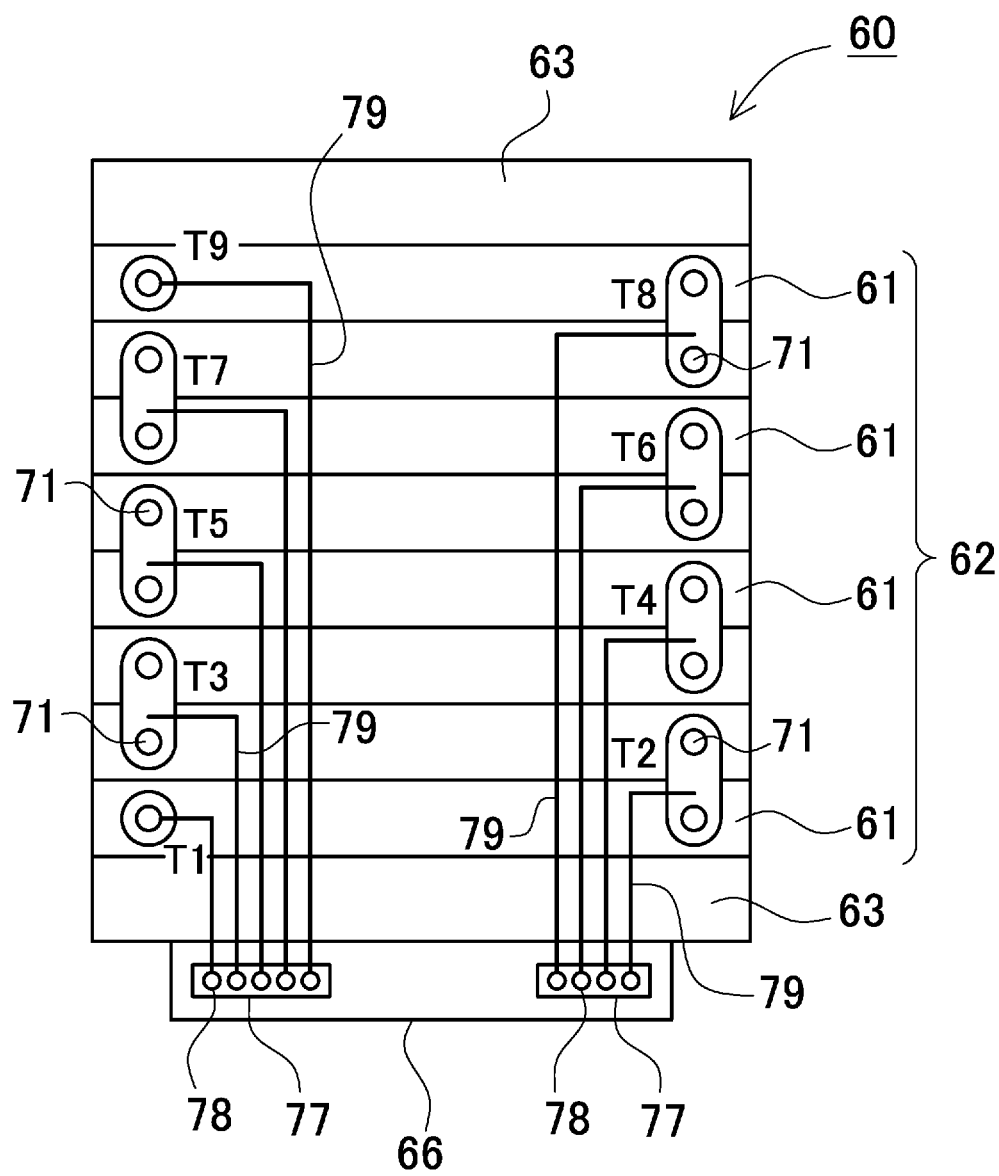
FIG. 12 is a schematic plan view of a battery module according to a reference example.

In the battery module, the overall height can be lowered by disposing the electronic circuit block not on the battery stack but on the outer surface of the end plate. The battery module includes a battery stack in which a plurality of battery cells are stacked, a pair of end plates disposed at both ends in a stacking direction of the battery stack, a binding bar connecting the pair of end plates, and an electronic circuit block on which a voltage detection circuit for detecting a voltage of the battery cell is mounted. The electronic circuit block is disposed on the outer surface of the end plate disposed at both ends of the battery stack, and is connected to each battery cell via a voltage detection line. In battery module 60, as shown in the plan view of FIG. 12, voltage detection line 79 connected to electrode terminal 71 of each battery cell 61 is wired on the upper surface of battery stack 62, that is, the terminal surface of battery cell 61, voltage detection line 79 is connected from the upper surface of battery stack 62 to electronic circuit block 66 on the surface of end plate 63, and the voltage of each battery cell 61 is detected by a voltage detection circuit (not illustrated) of electronic circuit block 66. Since positive and negative-electrode terminals 71 of battery cells 61 are arranged on both sides of battery stack 62, voltage detection lines 79 connected to electrode terminals 71 are arranged as two rows of wire harnesses on both sides of battery stack 62, and two sets of connectors 77 for connecting to electronic circuit block 66 are connected to each wire harness. Since battery stack 62 connects a large number of battery cells 61, the two sets of connectors 77 connect voltage detection lines 79 connected to battery cells 61 to connecting terminals 78 in the order of lamination.

Figure 13:
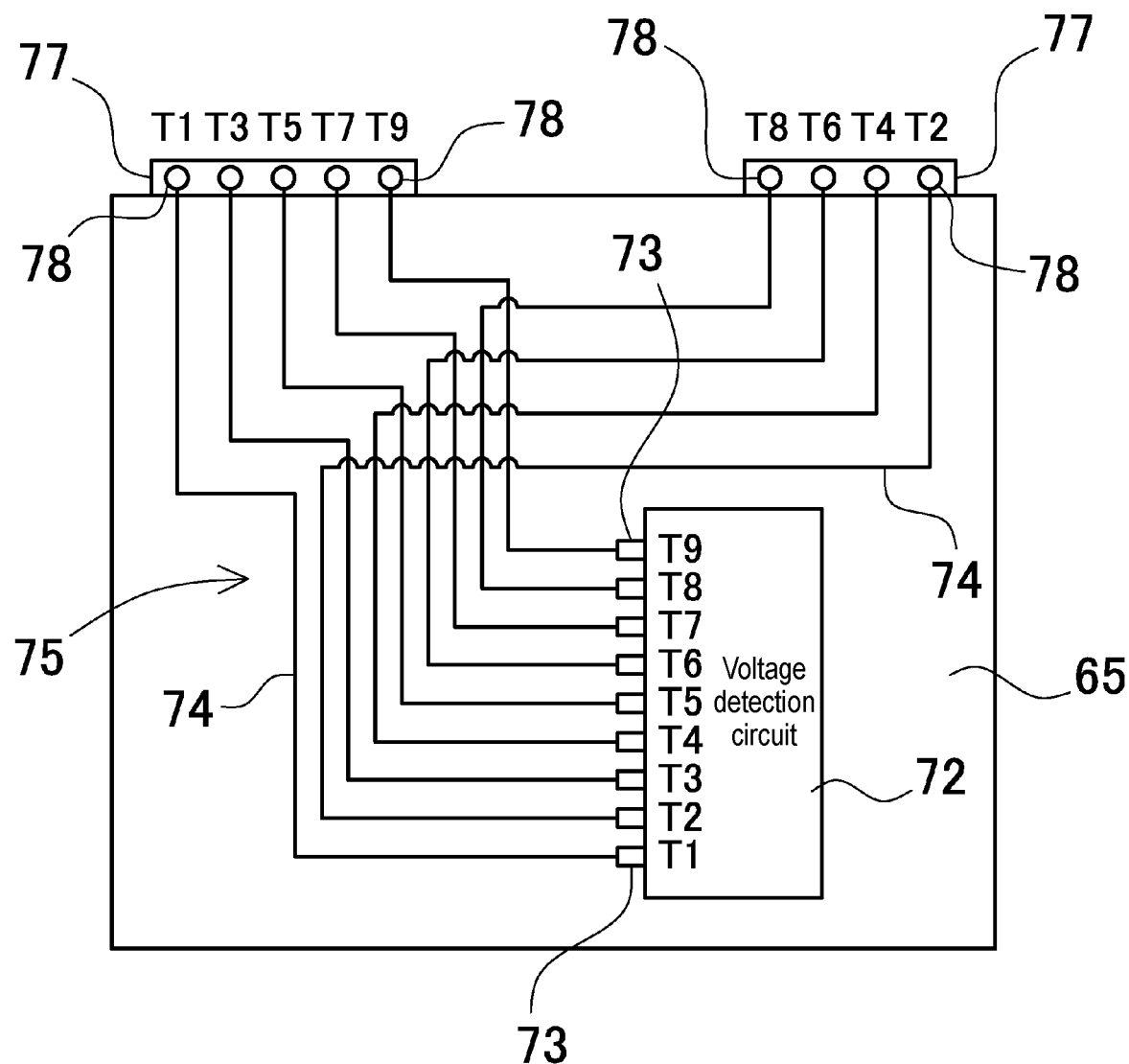
FIG. 13 is a block diagram showing a circuit board of an electronic circuit block of the battery module illustrated in FIG. 12.
Figure 14:
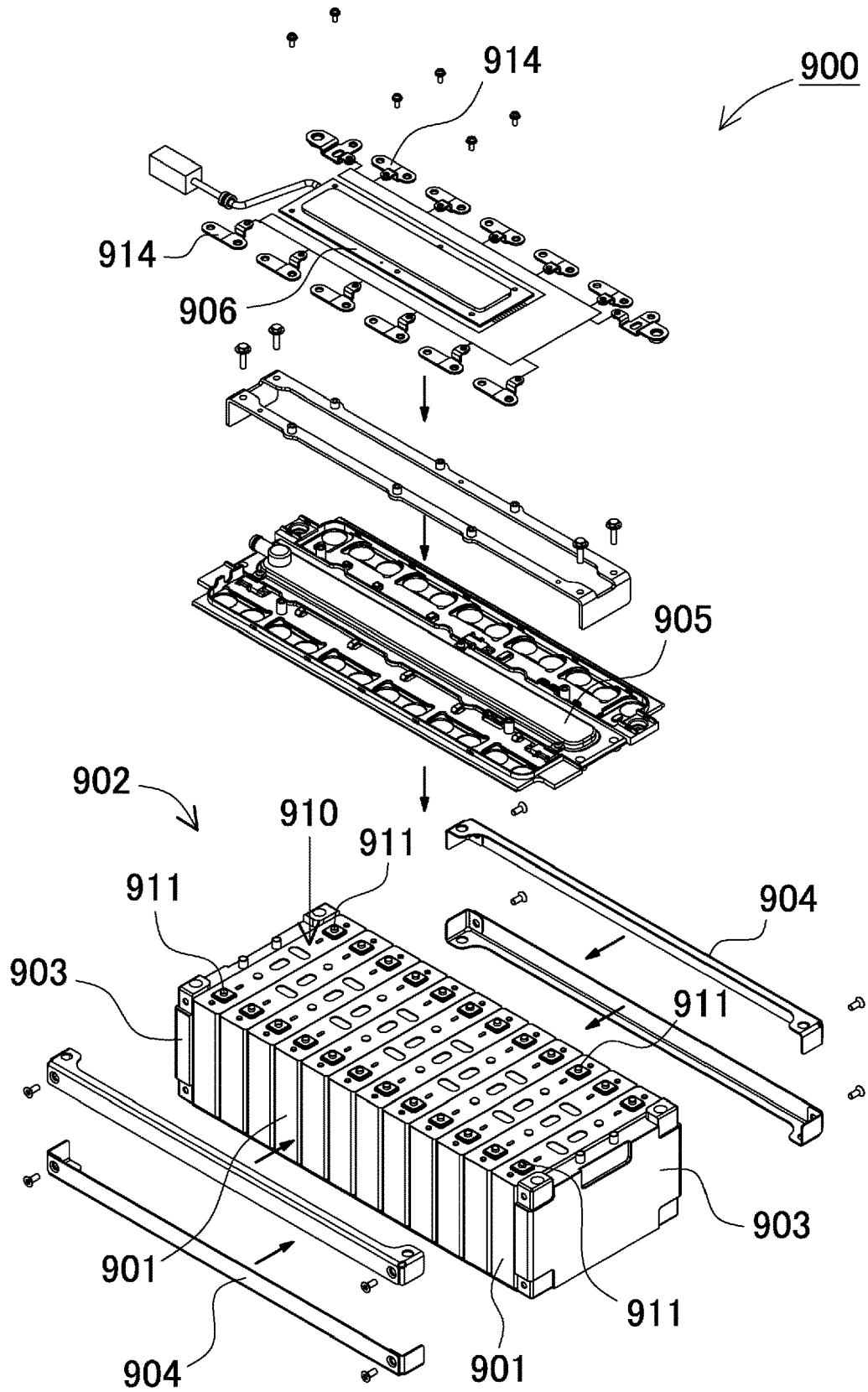
FIG. 14 is an exploded perspective view of a conventional battery module.

As illustrated in FIG. 13, in electronic circuit block 66, voltage detection circuit 72 is mounted on circuit board 65, and connector 77 is also mounted. Circuit board 65 is provided with, as wiring pattern 75, connection line 74 that connects input terminal 73 of voltage detection circuit 72 to connecting terminal 78 of connector 77. Input terminals 73 of voltage detection circuit 72 are connected to connection lines 74 of circuit board 65, connecting terminals 78 of connector 77, and electrode terminal 71 of each battery cell 61 via voltage detection line 79 to detect the voltage of battery cell 61, that is, the cell voltage. Since the voltage of each battery cell 61 is detected via the two sets of connectors 77, as illustrated in FIG. 13, wiring pattern 75 in which connection lines 74 intersect is formed. This is because connection lines 74 alternately connect connecting terminals 78 of the two sets of connectors 77 to input terminals 73 of voltage detection circuit 72 in order. Circuit board 65 of wiring pattern 75 where connection lines 74 intersect has, for example, a complicated structure in which wiring patterns 75 are provided on both surfaces and are connected by through-holes, which increases manufacturing cost. Further, long and complicated connection lines 74 are susceptible to noise, and there is a disadvantage that the detection accuracy of the cell voltage decreases. The power supply module described in the following embodiment solves the above disadvantages with a unique structure.

Hereinafter, the present invention will be described in detail with reference to the drawings. Note that, in the following description, terms (e.g., "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Further, parts denoted by the same reference marks in a plurality of drawings indicate the same or equivalent parts or members.

Furthermore, exemplary embodiments to be described below show a specific example of the technical idea of the present invention, and the present invention is not limited to the exemplary embodiments below. Further, unless otherwise specified, dimensions, materials, shapes, relative dispositions, and the like of the configuration components described below are not intended to limit the scope of the present invention only to them, but are intended to be illustrative. Furthermore, the contents described in one exemplary embodiment or example are also applicable to other exemplary embodiments and examples. Additionally, sizes, positional relationships, and the like of members illustrated in the drawings may be exaggerated for clarity of description.

A battery module according to a first exemplary embodiment of the present invention includes: a battery stack formed by stacking a plurality of battery cells; a pair of end plates disposed at both ends in a stacking direction of the battery stack; a binding bar formed by connecting the end plates; an electronic circuit block including a voltage detection circuit that detects a voltage of each battery cell; and a plurality of voltage detection lines formed by connecting positive and negative-electrode terminals of each battery cell and the electronic circuit block. The battery cell has a terminal surface formed by arranging positive and negative-electrode terminals at both ends. The battery stack is a stacked body formed by stacking a plurality of battery cells with the terminal surface on the same plane. The electronic circuit block is disposed on an outer surface of an end plate and includes a circuit board on which the voltage detection circuit is mounted. In the circuit board, one connector formed by linearly arranging a plurality of connecting terminals formed by connecting voltage detection lines is fixed. In the voltage detection circuit, a plurality of input terminals having adjacent input terminals as input terminals of the cell voltage of the battery cell are arranged in a linear manner. In the circuit board, the connecting terminal and the input terminal are arranged at positions facing each other. The connecting terminal and the input terminal at the positions facing each other are connected by a plurality of rows of connection lines. The cell voltage of each battery cell is input to the connecting terminal connected to the input terminal by the connection line.

In the above battery module, in addition to lowering the overall height by arranging the electronic circuit block outside the end plate, the circuit board can be produced in large quantity at low cost as a simple wiring pattern. The connection lines connected to the electrode terminals of all the battery cells are connected to one connector. The connecting terminal of the connector and the input terminal of the voltage detection circuit are connected by a short and simple connection line. Therefore, the voltage of the battery cell is detected with high accuracy. Since the battery module controls charging and discharging with the cell voltage, being able to detect the cell voltage with high accuracy is effective for preventing overcharge and overdischarge of the battery cell. Overcharge and overdischarge of the battery cause degradation of the battery. Therefore, the battery module capable of detecting the voltage of the battery cell with high accuracy is effective in suppressing degradation and extending the life. The above features achieved by the battery module are achieved by fixing one connector in which a plurality of connecting terminals connecting voltage detection lines are arranged in a linear manner to a circuit board, arranging input terminals of a voltage detection circuit mounted on the circuit board in a linear form, arranging the connecting terminals of the connectors arranged in a linear form and the input terminals of the voltage detection circuit at opposing positions, providing a plurality of rows of connection lines connecting the connecting terminals and the input terminals at the opposing positions as a simple wiring pattern, and inputting a cell voltage of each battery cell to the input terminals provided adjacent to the voltage detection circuit.

In the above battery module, since the electronic circuit block is disposed on the outer surface of the end plates and not disposed on the terminal surface of the battery stack, the electronic circuit block can be protected from the high-temperature, high-pressure exhaust gas ejected by the battery cells while designing the entire battery module to be low. Further, since the end plates are disposed between the battery stack and the electronic circuit block, the end plates can shield the electronic circuit block from the exhaust gas of the battery cells to protect the electronic circuit block from the high-temperature, high-pressure exhaust gas. Therefore, the normal operation of the electronic circuit block is guaranteed even in an abnormal state, and high safety is guaranteed. In addition, since heat generated by the electronic circuit block can be efficiently dissipated to the end plates, a temperature rise of the electronic circuit block can be reduced. Furthermore, the electronic circuit block is disposed on the surface of the end plates in a vertical posture, so that cooling efficiency can be increased by the air smoothly convecting on the surface of the electronic circuit block. Even in a circuit configuration in which the electronic circuit block is downsized and heat is concentrated in a narrow region, the structure capable of efficiently dissipating heat from the electronic circuit block can guarantee a more stable operation by reducing a local temperature rise and also reducing a temperature rise of a heat-generating electronic component of the electronic circuit block.

In the battery module according to a second exemplary embodiment of the present invention, a wiring pattern in which the connection lines do not intersect each other is provided on the surface of the circuit board, and the connection lines input the cell voltages of the respective battery cells to adjacent input terminals of the voltage detection circuit.

In the above battery module, since the wiring pattern in which the plurality of rows of connection lines do not intersect is provided on the surface of the circuit board, a large amount of wiring patterns formed on the circuit board can be produced at low cost as a simple structure.

In the battery module according to a third exemplary embodiment of the present invention, the battery stack includes the terminal surface of the battery cell arranged on the upper surface and the voltage detection line wired on the upper surface of the battery stack, and the connector provided on the circuit board of the electronic circuit block includes the plurality of connecting terminals arranged in a linear shape extending along the upper edge of the circuit board.

In the battery module described above, the battery stack includes the terminal surface of the battery cell disposed on the upper surface, and the voltage detection line is wired on the upper surface of the battery stack. In this specification, the "upper surface" of the battery stack means the terminal surface of the battery cell. Therefore, for example, in a battery module used in a lying posture in which the battery stack of FIG. 1 rotates 90 degrees, the upper surface of the battery stack is a side surface.

In a battery module according to a fourth exemplary embodiment of the present invention, a plurality of input terminals provided in a voltage detection circuit mounted on a circuit board are arranged extending in the same direction as the connecting terminals.

In a battery module according to a fifth exemplary embodiment of the present invention, a plurality of input terminals provided in a voltage detection circuit mounted on a circuit board are arranged in a linear manner extending in the same direction as the connecting terminals.

In the battery module according to a sixth exemplary embodiment of the present invention, the circuit board is a wiring pattern in which a plurality of rows of connection lines are arranged in parallel.

In a battery module according to a seventh exemplary embodiment of the present invention, adjacent connecting terminals of a connector are connected to voltage detection lines connected to positive and negative-electrode terminals of battery cells arranged at both ends of a terminal surface of a battery cell, and a cell voltage of each battery cell is input to the adjacent connecting terminals.

In the battery module according to an eighth exemplary embodiment of the present invention, the voltage detection circuit is a circuit that detects a voltage of adjacent input terminals as a cell voltage.

In the battery module according to a ninth exemplary embodiment of the present invention, the connecting terminals of the connectors are arranged linearly.

In the battery module according to a tenth exemplary embodiment of the present invention, the input terminals of the voltage detection circuit are arranged linearly.

In the battery module according to an eleventh exemplary embodiment of the present invention, the voltage detection line is a wire harness.

First Exemplary Embodiment

The battery module shown in the following example is mainly optimal for a power source of an electric vehicle such as a hybrid automobile or a plug-in hybrid automobile that runs by both an engine and a motor, an electric automobile that runs only by a motor, and an electric motorcycle that runs by a motor. However, the battery module of the present invention is also suitable for a power source for a power storage device that is an application requiring a large output other than an electric vehicle.

Battery module 10 shown in FIGS. 1 to 4 includes battery stack 2 in which a plurality of battery cells 1 are stacked in a thickness, a pair of end plates 3 disposed at both ends in a stacking direction of battery cells 1 of battery stack 2, binding bar 4 coupled to end plates 3 at both ends of battery stack 2, and electronic circuit block 6 on which a voltage detection circuit is mounted which detects the voltage of battery cells 1 of battery stack 2. Furthermore, battery module 10 shown in the figures includes gas duct 5 coupled to an opening of exhaust valve 1a provided in each battery cell 1, upper surface cover 8 disposed above battery stack 2 and on gas duct 5, and base plate 9 disposed below the battery stack and fixing end plates 3.

(Battery Cell 1)

Figure 2:
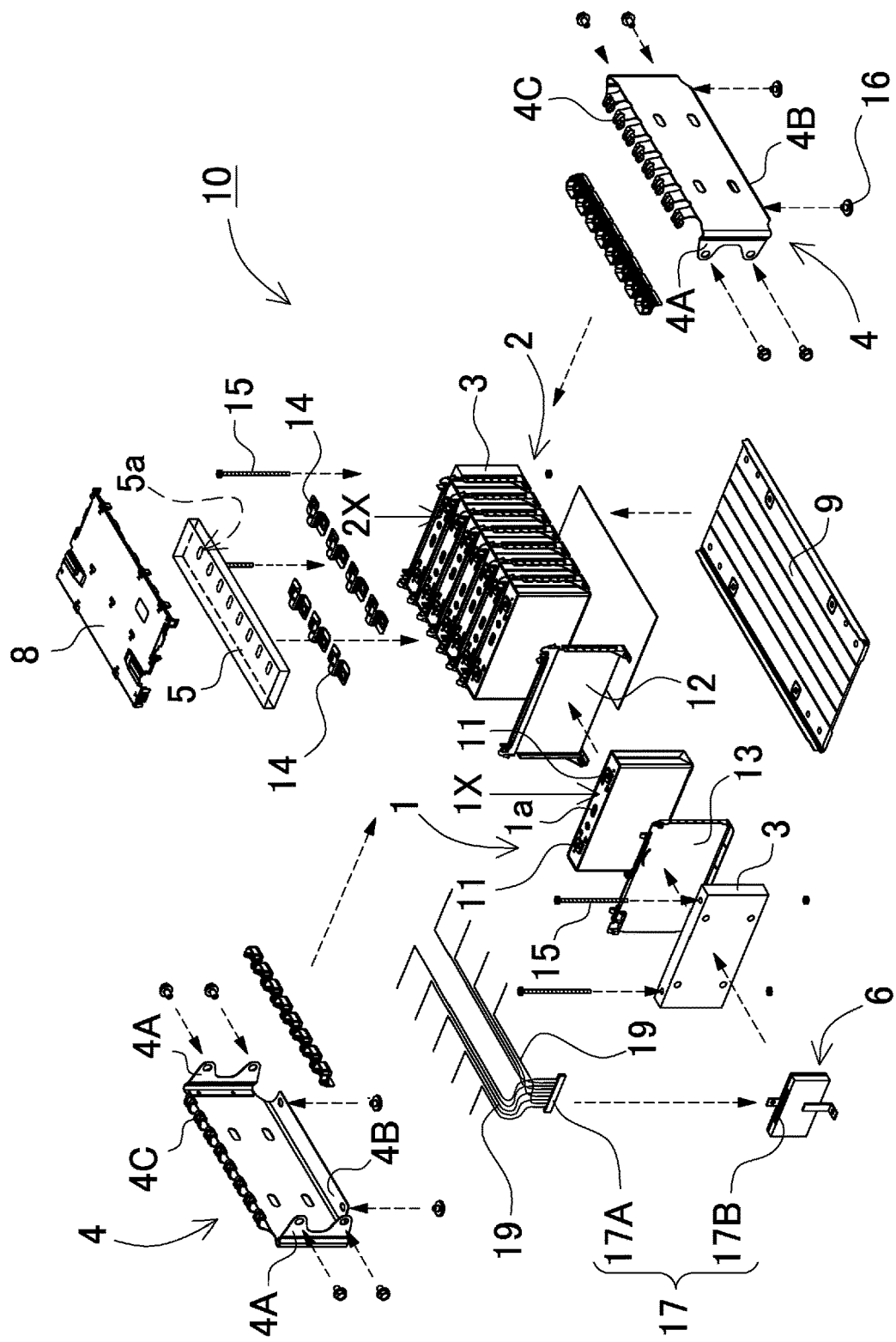
FIG. 2 is an exploded perspective view of the battery module illustrated in FIG. 1.

As illustrated in FIG. 2, battery cell 1 is a rectangular secondary battery having a width larger than the thickness, in other words, thinner than the width, and battery cells 1 are stacked in the thickness to form battery stack 2. Battery cell 1 is a lithium-ion secondary battery. However, the battery cell may be any other chargeable secondary battery, such as a nickel metal hydride battery and a nickel cadmium battery. In battery cell 1, positive and negative electrode plates are housed in an exterior can having a sealed structure together with an electrolyte solution. The exterior can is formed by press-molding a metal sheet made of aluminum, an aluminum alloy, or the like into a rectangular shape, and an opening is hermetically sealed with a sealing plate. The sealing plate is made of the aluminum or aluminum alloy same as the exterior can, and fixes positive and negative-electrode terminals 11, and an exhaust valve 1a is provided between electrode terminals 11. Positive and negative-electrode terminals 11 are in a state where at least one of electrode terminals 11 is insulated from the sealing plate. Battery cell 1 is provided with positive and negative-electrode terminals 11 with the sealing plate as terminal surface 1X. In battery cell 1, a bottom surface and a side surface of the exterior can are covered with an insulating film.

The plurality of battery cells 1 are stacked to allow the thickness of each battery cell 1 to be aligned with the stacking direction to constitute battery stack 2. Terminal surface 1X provided with positive and negative-electrode terminals 11 is disposed on the same plane, and thus the plurality of battery cells 1 are stacked to form terminal surface 2X, thus forming battery stack 2.

(Battery Stack 2)

As illustrated in FIG. 2, in battery stack 2, insulating spacer 12 is held between stacked battery cells 1. Insulating spacer 12 in the figure is made of an insulating material such as resin formed into a thin plate shape or a sheet shape. Insulating spacer 12 illustrated in the figure has a plate shape having substantially the same size as an opposing surface of battery cell 1. Insulating spacer 12 is stacked between adjacent battery cells 1 and insulates adjacent battery cells 1 from each other. As the spacer arranged between adjacent battery cells 1, a spacer having a shape in which a flow path of a cooling gas is formed between the battery cell and the spacer may also be used.

In battery stack 2, bus bars 14 made of metal are connected to positive and negative-electrode terminals 11 of adjacent battery cells 1. The plurality of battery cells 1 are connected in series or in parallel or in series and in parallel by bus bars 14. In battery stack 2, the output voltage and the chargeable and dischargeable capacity are set as setting values by the number of battery cells 1 to be stacked. In battery stack 2, the output voltage can be increased by the number of battery cells 1 connected in series and increasing the charge and discharge capacity by the number of battery cells 1. In battery module 10, the output voltage and the capacity are set as setting values by the number of battery cells 1 constituting battery stack 2 and the connection state of connecting in series and in parallel. Therefore, the number of battery cells 1 and the connection state are in an optimal state in consideration of the application.

Bus bar 14 is provided with a connection part (not illustrated) for connection to electrode terminal 11. Bus bar 14 is welded and connected to electrode terminal 11 by irradiating a boundary connecting the connection part and electrode terminal 11 with a laser beam. The bus bar may be coupled to the electrode terminal by providing a male screw in the electrode terminal, opening a through-hole for inserting the electrode terminal, and screwing a nut into the male screw of the electrode terminal inserted in the through-hole, or may be coupled to the electrode terminal by providing a female screw hole in the electrode terminal, and screwing a set screw penetrating the bus bar into the female screw hole. In battery module 10, an upper surface of battery stack 2 can be provided with a resin insulating cover (not illustrated). The insulating cover is provided with an opening, electrode terminal 11 is exposed from this opening, bus bar 14 of a metal sheet is connected to electrode terminal 11 exposed from the opening of the insulating cover on the upper surface side of the insulating cover, and the plurality of battery cells 1 can be connected in a predetermined array.

(End Surface Spacer 13)

In battery stack 2, end plates 3 can be arranged on both end surfaces with end surface spacers 13 sandwiched therebetween in order to insulate the battery stack from end plates 3 made of metal. End surface spacers 13 are arranged between battery stack 2 and end plates 3 to insulate end plates 3 from battery stack 2. Each end surface spacer 13 is made of an insulating material such as resin and formed into a thin plate shape or a sheet shape. End surface spacer 13 is provided with a plate part having a size capable of covering the entire opposing surface of battery cell 1, and this plate part is stacked between battery cell 1 and end plates 3 arranged at both ends of battery stack 2.

(End Plate 3)

End plates 3 are provided on both end surfaces of battery stack 2 in the stacking direction of battery cells 1, and fix battery stack 2. End plate 3 is a metal sheet and is a quadrangular plate whose outer shape is substantially equal to the outer shape of battery cell 1 or slightly larger than battery cell 1. End plate 3 can be made of a high-tensile strength steel to have a tough structure. End plate 3 can be a single metal sheet, can have a structure in which a plurality of metal sheets are stacked, or can be a stacked body of a metal sheet and plastic. End plate 3 made of one metal sheet has a large heat capacity, and can efficiently absorb heat energy of electronic circuit block 6. In end plate 3 on which the plurality of plates are stacked, the surface to which electronic circuit block 6 is fixed is at least a metal sheet. This is because electronic circuit block 6 is fixed in a thermally coupled state and improves heat dissipation characteristics. End plate 3 can be a stacked structure of an aluminum plate and a high-tensile steel plate. This end plate can also have a structure in which the electronic circuit block is fixed with the surface as an aluminum plate, the aluminum plate and the high-tensile steel plate are stacked in a surface contact state, and heat can be efficiently conducted from the aluminum plate to the high-tensile steel plate. However, the end plate is not necessarily made of metal, and may be made of plastic having excellent strength, such as engineering plastic.

(Binding Bar 4)

Binding bar 4 extends in the stacking direction of battery cells 1, fixes both ends to end plate 3, and fixes battery stack 2 with the pair of end plates 3. Each binding bar 4 shown in the figures is a metal sheet having a predetermined vertical width along a side surface of battery stack 2 and a predetermined thickness. Binding bars 4 are disposed so as to oppose both side surfaces of battery stack 2. Binding bars 4 pressurize both end surfaces of battery stack 2 with a strong pressure, and dispose battery cells 1 about to swell by charging and discharging at a fixed position. As the metal sheet of binding bar 4, a high tensile strength steel is preferably used. Binding bar 4 made of a metal sheet is formed into a predetermined shape by press-molding.

As shown in the exploded perspective view of FIG. 2, to fix both ends of binding bar 4 to the pair of end plates 3, fixing parts 4A bent along the outer surface of end plate 3 are provided at both ends of binding bar 4 in the stacking direction of battery stack 2. Binding bar 4 fastens the pair of end plates 3 by, for example, screwing fixing parts 4A to end plates 3.

Figure 3:
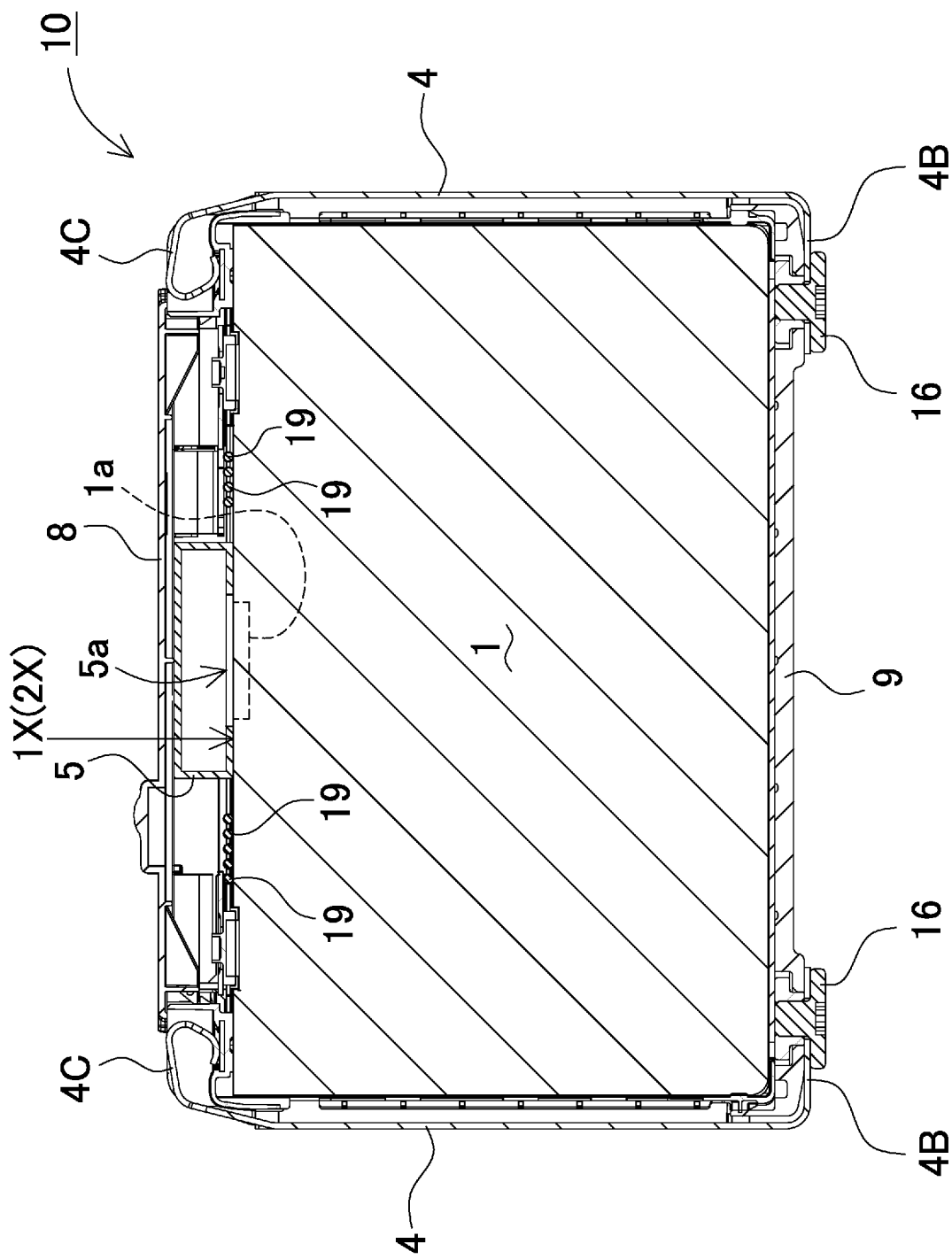
FIG. 3 is a cross-sectional view taken along line of the battery module illustrated in FIG. 1.

Further, as shown in FIGS. 2 and 3, a lower end of binding bar 4 is bent into an L shape to form lower coupling piece 4B. This lower coupling piece 4B is stacked on the lower surface of both side parts of base plate 9 and coupled to base plate 9. Binding bar 4 is bent at an upper end to form pressing pieces 4C that press an end of the upper surface of battery stack 2. Pressing pieces 4C are separated for each battery cell 1 so as to individually press upper surfaces of battery cells 1 of battery stack 2. This allows each pressing piece 4C to press battery cell 1 toward base plate 9 independently of adjacent pressing pieces 4C. In this way, each battery cell 1 is blocked from floating from base plate 9 and held in a height direction, and even though vibration, impact, and the like are applied to battery stack 2, each battery cell 1 can be maintained so as not to be displaced in an up-down direction. In this manner, binding bars 4 cover and hold corners of upper and lower surfaces of battery stack 2 on both left and right sides of battery stack 2.

As for the shape of binding bar 4 and the structure for fastening with end plates 3, known structures can be appropriately used. For example, both ends of the binding bar may be formed into a flat plate shape without being bent into an L shape and may be screwed with a side surface of the end plate. Alternatively, a part where the binding bar opposes the side surface of the end plate may have an engagement structure to be engaged in a stepped manner, and the binding bar may be further screwed in a state of being locked to the side surface of the end plate with a locking structure.

An insulating sheet may be interposed between binding bar 4 and battery stack 2. The insulating sheet is made of a material having an insulating property such as resin and provides insulation between binding bar 4 made of metal and battery cells 1.

(Base Plate 9)

Figure 1:
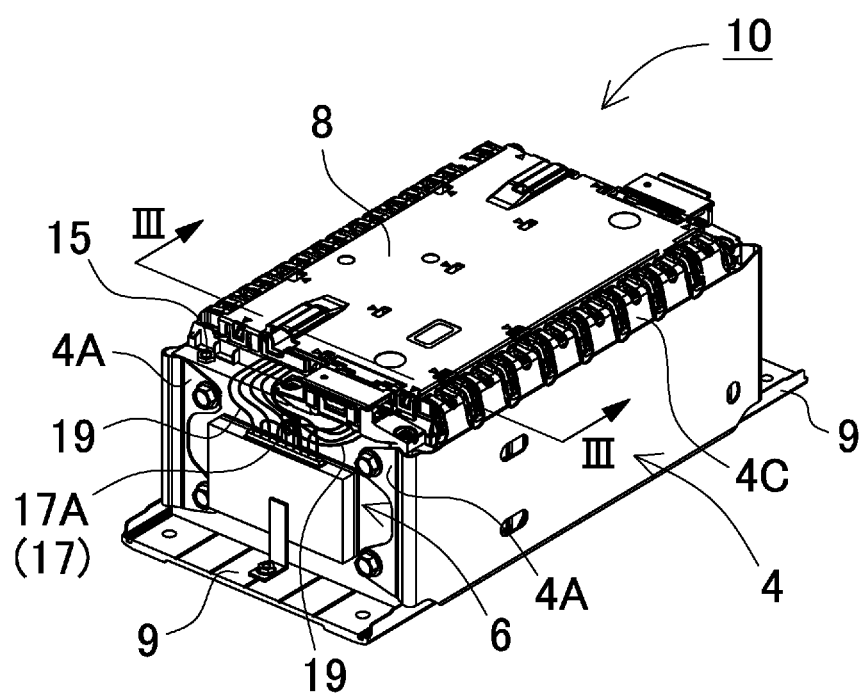
FIG. 1 is a perspective view of a battery module according to a first exemplary embodiment of the present invention.

As shown in FIGS. 1 to 3, base plate 9 is disposed on the bottom surfaces of battery stack 2 and end plate 3. End plate 3 is fixed to base plate 9, and more preferably, the lower end part of binding bar 4 is also fixed to base plate 9. End plate 3 and binding bar 4 are fixed to base plate 9 via fixing screws 15, 16. Fixing screw 15 for fixing end plate 3 penetrates end plate 3 in the up-down direction and fixes end plate 3 to base plate 9. Fixing screw 16 for fixing binding bar 4 also penetrates lower coupling piece 4B, which is a lower end of binding bar 4, and is fixed to base plate 9.

In battery stack 2, each battery cell 1 is arranged in a thermally coupled state with base plate 9 in contact with base plate 9. Battery cell 1 thermally coupled to base plate 9 dissipates heat energy to base plate 9. Base plate 9 may be forcibly cooled to further efficiently dissipate heat energy of battery cell 1. Although not illustrated, base plate 9 to be forcibly cooled can be forcibly cooled by circulating a refrigerant or a coolant inside of the base plate. The base plate may also be forcibly cooled by providing a heat dissipation fin on the lower surface. The base plate can also be forcibly cooled by a cooling plate stacked in a surface contact state on the lower surface of the base plate. The cooling plate can be forcibly cooled by circulating a refrigerant or a coolant inside of the cooling plate.

(Gas Duct 5)

Figure 4:
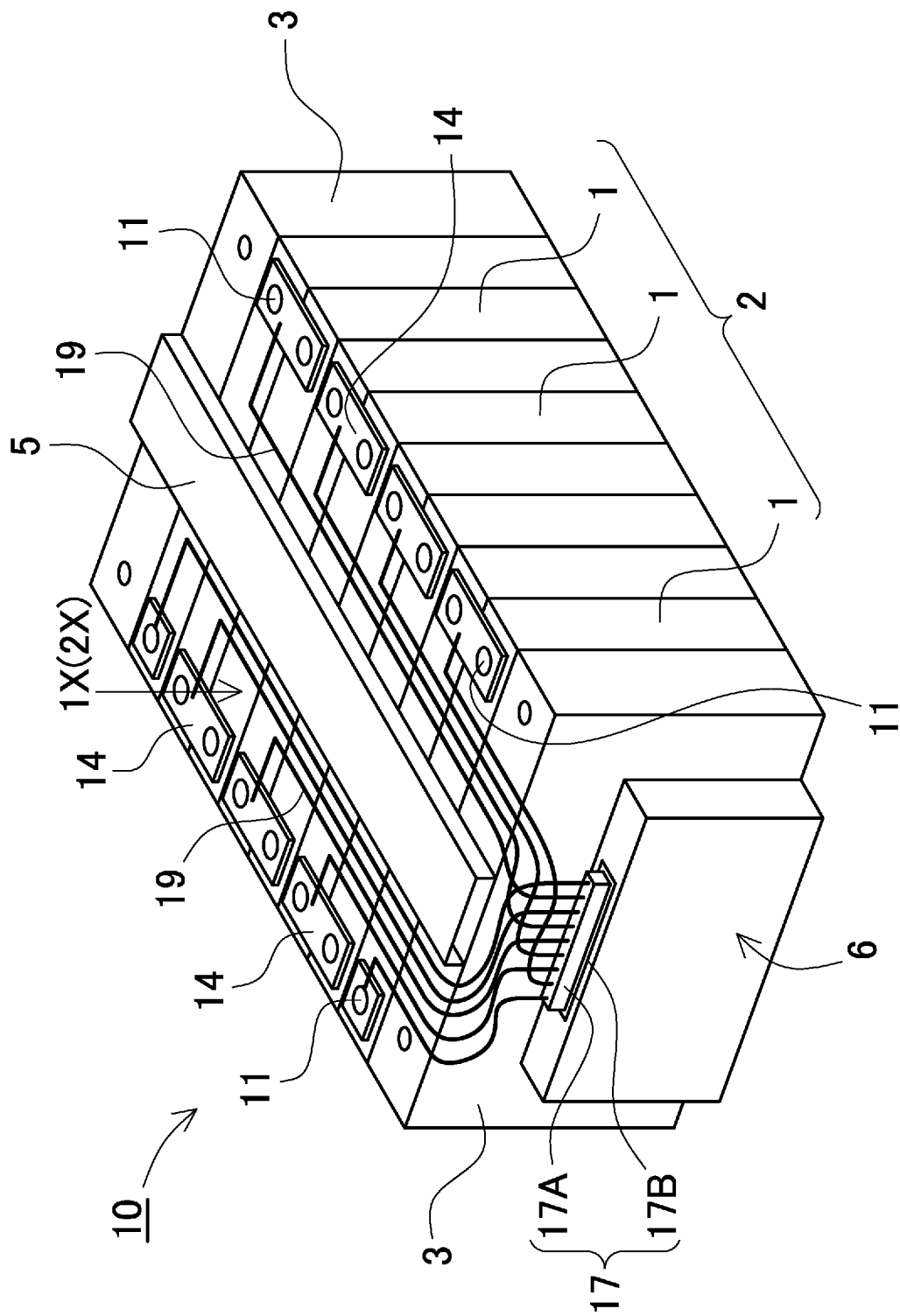
FIG. 4 is a broad perspective view of the battery module according to the first exemplary embodiment of the present invention.

As shown in FIGS. 3 and 4, gas duct 5 is disposed at a position opposite to the upper surface of battery cell 1, that is, terminal surface 1X of battery cell 1, and ejects the exhaust gas ejected from exhaust valve 1a to the outside. Gas duct 5 illustrated in FIG. 4 is disposed at the central portion of terminal surface 2X of battery stack 2 extending in the stacking direction of battery cells 1. Gas duct 5 has a cylindrical shape with an inner capacity for smoothly ejecting the discharged material ejected from the opening of exhaust valve 1a, opens at a lower surface, and is coupled to the opening of exhaust valve 1a of each battery cell 1. Gas duct in FIG. 4 has a rectangular cylinder shape with a horizontally wide rectangular cross section. So as to eject the exhaust gas ejected from exhaust valve 1a to the outside, gas duct 5 is disposed on the upper surface of battery stack 2 in close contact with the upper surface of battery stack 2 so that a gap cannot be formed between the gas duct and terminal surface 1X of battery cell 1 and opening 5a opening on the lower surface is coupled to exhaust valve 1a of each battery cell 1. Gas duct 5 may be arranged so as not to leak the exhaust gas by arranging a packing or sealing material or the like between the gas duct and terminal surface 1X.

Although not illustrated, the gas duct may be configured by a collective duct arranged on the upper surface of the battery stack extending in the stacking direction of the battery cells, and a branch duct coupled to the collective duct and having a tip end coupled to the exhaust valve. In this gas duct, the collective duct can be arranged away from the terminal surface, and the tip end of the branch duct can be coupled to the opening of the exhaust valve.

(Electronic Circuit Block 6)

Figure 5:
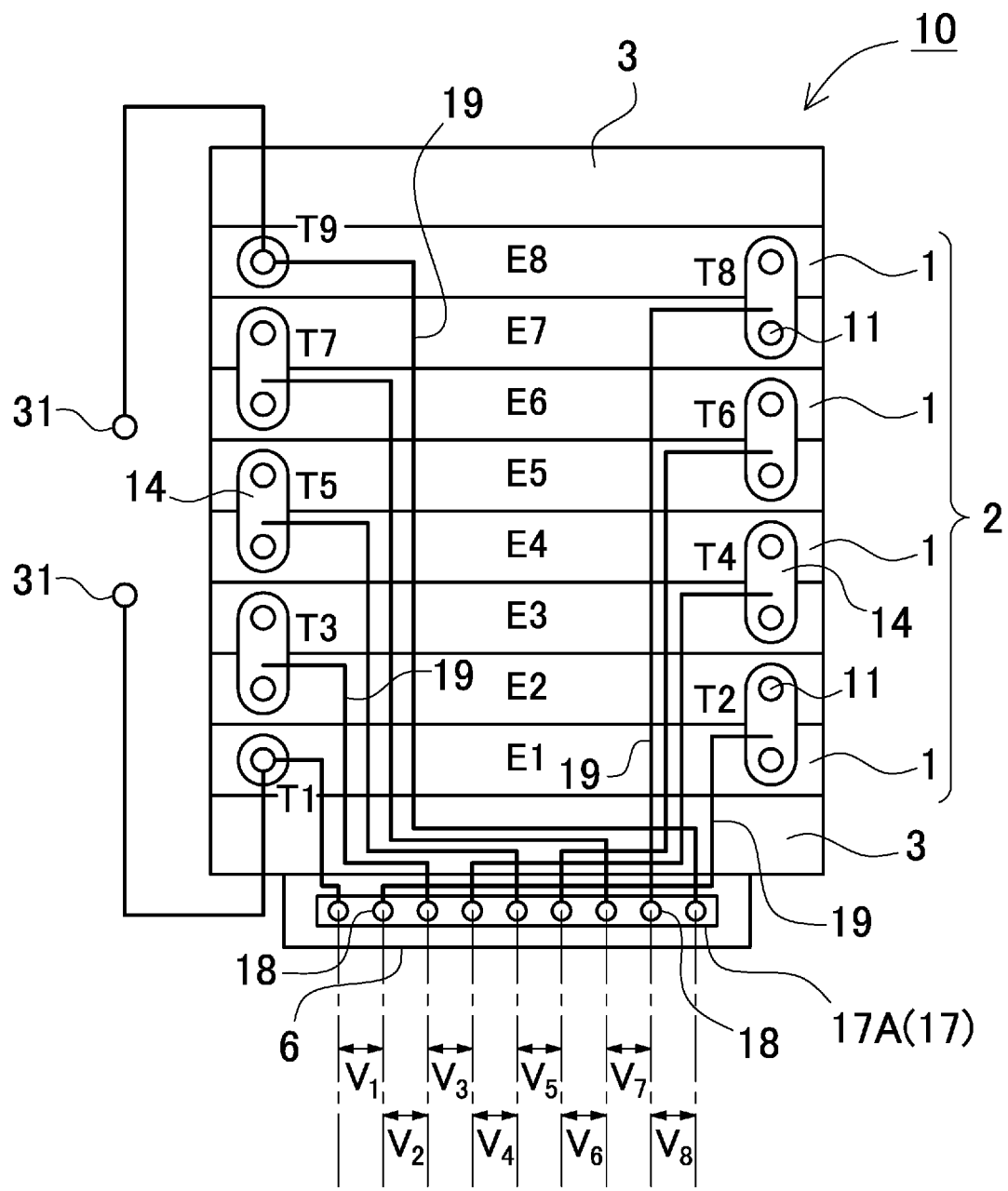
FIG. 5 is a schematic plan view of the battery module according to the first exemplary embodiment of the present invention.
Figure 6:
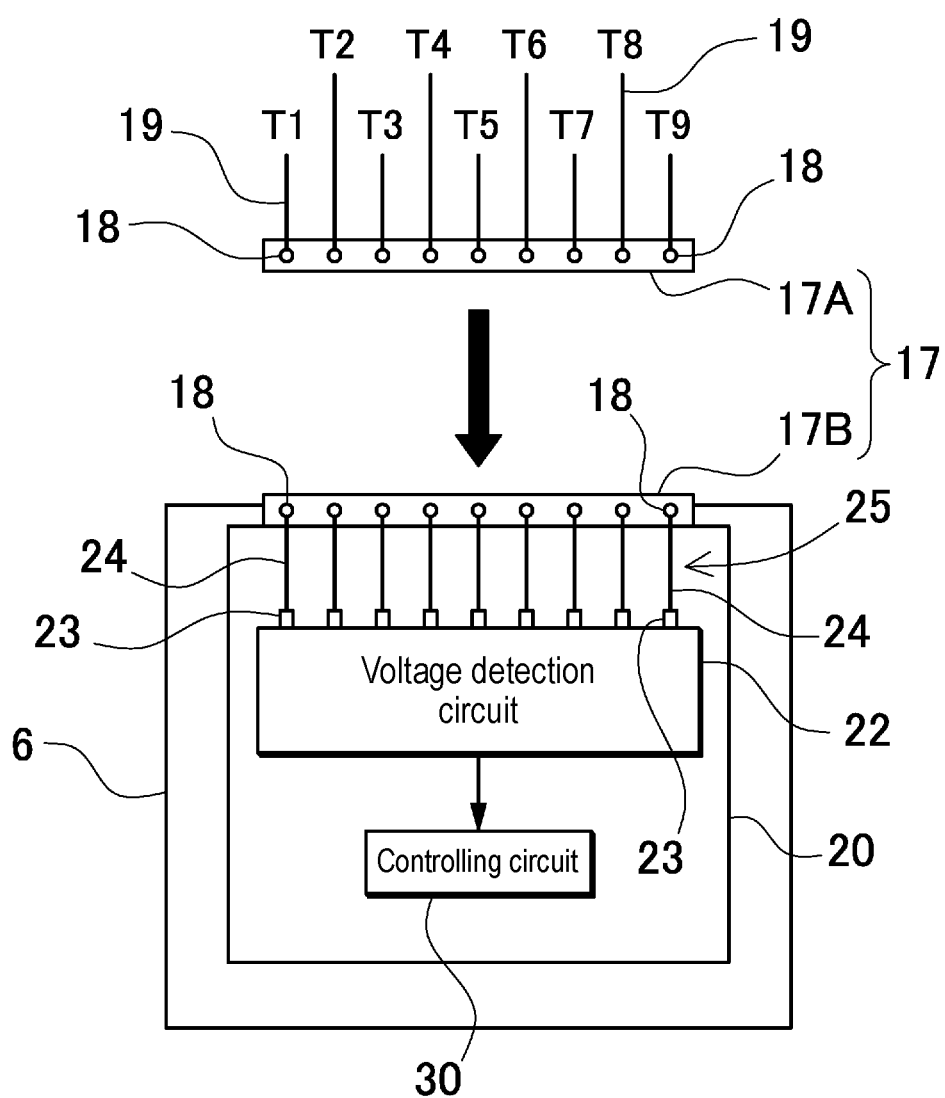
FIG. 6 is a block diagram illustrating an example of a circuit board of an electronic circuit block.

In battery module 10 of FIGS. 2, 4, and 5, electronic circuit block 6 is fixed to an outer surface of end plate 3 that fixes battery stack 2 by pressurization from both ends. As illustrated in FIGS. 4 and 6, in electronic circuit block 6, voltage detection circuit 22 that detects the voltage of battery cell 1 is mounted on circuit board 20. Electronic circuit block 6 connects voltage detection circuit 22 to electrode terminal 11 of battery cell 1 via voltage detection line 19. Voltage detection line 19 is wired on an upper surface of battery stack 2 in which terminal surfaces 1X of battery cells 1 are disposed on the same plane, and connects electrode terminals 11 of respective battery cells 1 to electronic circuit block 6. All voltage detection lines 19 are connected to electronic circuit block 6 via one connector 17.

Voltage detection line 19 has one end connected to electrode terminal 11 of battery cell 1 and the other end connected to connecting terminal 18 of connector 17. Voltage detection line 19 in FIGS. 4 and 5 includes a wire harness. The wire harness connects all voltage detection lines 19 to one connector 17. However, in the present invention, the voltage detection line does not necessarily need to be a wire harness, and can be formed of a flexible printed circuit board, a flexible flat cable, or the like.

Connector 17 connects adjacent connecting terminals 18 to positive and negative-electrode terminals 11 of respective battery cells 1 via respective voltage detection lines 19. As illustrated in FIG. 5, connector 17 connects voltage detection line 19 to connecting terminal 18 such that the cell voltage of each battery cell 1 is input to adjacent connecting terminal 18. In FIG. 5, voltages V1, V2, V3, V4, V5, V6, V7, and V8 of battery cells E1, E2, E3, E4, E5, E6, E7, and E8 stacked in order from the bottom to the top are output between adjacent connecting terminals 18 of connector 17 as follows.

In voltages of each battery cell 1,
voltage V1 is output as a voltage between terminals T1 and T2,
voltage V2 is output as a voltage between terminals T2 and T3,
voltage V3 is output as a voltage between terminals T3 and T4,
voltage V4 is output as a voltage between terminals T4 and T5,
voltage V5 is output as a voltage between terminals T5 and T6,
voltage V6 is output as a voltage between terminals T6 and T7,
voltage V7 is output as a voltage between terminals T7 and T8, and
voltage V8 is output as a voltage between terminals T8 and T9.

Connector 17 includes line-side connector 17A connecting all voltage detection lines 19 and board-side connector 17B fixed to circuit board 20, and connects both connectors 17, so that voltage detection line 19 is connected to electronic circuit block 6. In line-side connector 17A, the plurality of connecting terminals 18 connecting voltage detection lines 19 are arranged in a straight line, in the drawing, linearly. In board-side connector 17B, connecting terminals 18 connected to circuit board 20 are arranged in a straight line so that connecting terminals 18 of the line-side connector 17A can be connected. Both connectors 17 have an elongated shape in which the plurality of connecting terminals 18 are arranged in a straight line, connect all voltage detection lines 19 to circuit board 20, and input the voltage of each battery cell to electronic circuit block 6.

In connector 17 of FIGS. 5 and 6, the plurality of connecting terminals 18 connecting voltage detection lines 19 are arranged in a straight line of one row, but the connector can also arrange the plurality of connecting terminals in a straight line of two rows. The connector has an elongated shape in which a plurality of connecting terminals are linearly arranged in a plurality of rows, and all voltage detection lines are connected to the circuit board, so that the voltage of each battery cell can be input to the electronic circuit block. In the connectors in which the connecting terminals are arranged in a plurality of linear rows, similarly to the connectors in which the connecting terminals are arranged in a single linear row, the voltage detection lines are connected to the adjacent connecting terminals such that the respective cell voltages are input.

Voltage detection circuit 22 mounted on circuit board 20 includes a plurality of input terminals 23 arranged in a linear manner. Voltage detection circuit 22 detects a voltage of battery cell 1 by a voltage input to input terminal 23. In voltage detection circuit 22, a plurality of input terminals 23 are arranged in a linear manner, and adjacent input terminals 23 are used as input terminals of the cell voltage of battery cell 1. Input terminal 23 is connected to connecting terminal 18 of connector 17 via connection line 24 provided as wiring pattern 25 of circuit board 20. Voltage detection circuit 22 is connected to electrode terminals 11 of respective battery cells 1 via connection line 24, connector 17, and voltage detection line 19. In battery module 10 of FIG. 4 and FIG. 5, adjacent battery cells 1 are connected in series by bus bars 14, so that voltages of bus bars 14 connected to electrode terminals 11 and positive and negative output terminals 31 are detected to detect voltages of all battery cells 1.

Figure 7:
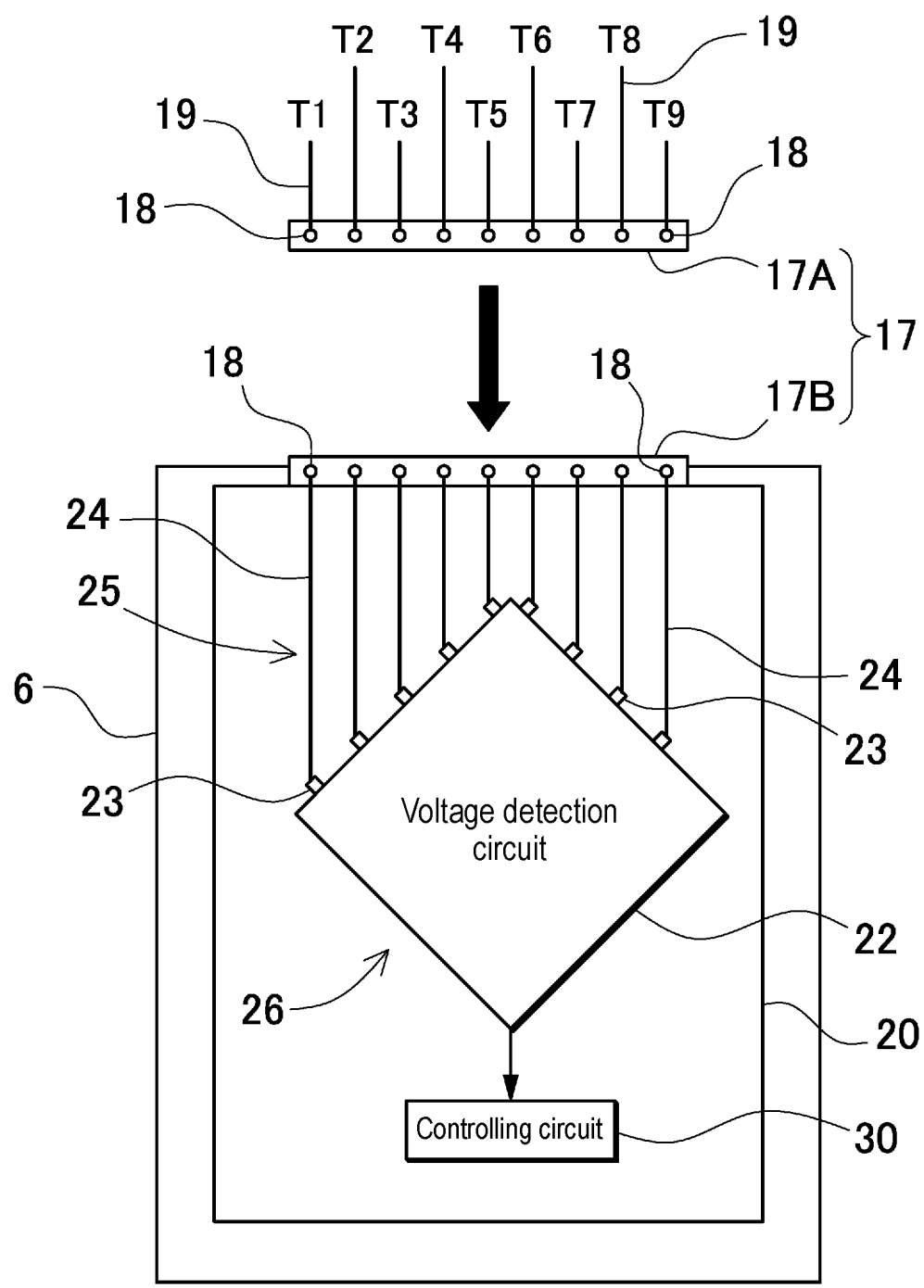
FIG. 7 is a block diagram showing another example of the circuit board of the electronic circuit block.

In circuit board 20, connecting terminal 18 of connector 17 and input terminal 23 of voltage detection circuit 22 are disposed at positions facing each other. By arranging connecting terminal 18 and input terminal 23 at opposing positions, connection line 24 is shortened, and further the lengths are made substantially equal. Therefore, the respective cell voltages can be accurately detected. Connecting terminal 18 and input terminal 23 arranged at the facing positions are connected by a plurality of rows of connection lines 24. In circuit board 20 of FIG. 6, the arrangement direction of connecting terminals 18 of the elongated connector 17 and the arrangement direction of input terminals 23 are arranged in parallel. In input terminal 23 disposed at a position facing connecting terminal 18, input terminal 23 and connecting terminal 18 are arranged in a linear manner extending in the same direction, and the lengths of connection lines 24 can be substantially equal. Further, as illustrated in FIG. 7, circuit board 20 can be arranged such that input terminals 23 are arranged in a line along a mountain shape at a corner portion of electronic component 26 having a rectangular shape in plan view and realizing voltage detection circuit 22, and input terminals 23 and connecting terminals 18 are arranged in a line shape extending in the same direction.

In circuit board 20 of FIG. 6, wiring pattern 25 in which the plurality of rows of connection lines 24 do not intersect each other is provided on the surface of circuit board 20. Circuit board 20 of wiring pattern 25 in which connection lines 24 do not intersect can be produced in large quantities at low cost with a simple structure. The plurality of rows of connection lines 24 connect each connecting terminal 18 to each input terminal 23. Therefore, the number of connecting terminals 18, the number of input terminals 23, and the number of connection lines 24 are the same, and each of connecting terminals 18 is connected to each of input terminals 23 via connection line 24 of each row. Circuit board 20 of FIG. 6 is provided with wiring pattern 25 having connection lines 24 in a parallel posture on the surface. When the interval between the input terminals is different from the interval between the connecting terminals, the circuit board can be smoothly connected by bending the middle of the connection line extending in the longitudinal direction in the lateral direction and adjusting the interval.

Voltage detection circuit 22 is a circuit that detects the voltage of adjacent input terminals 23 as a cell voltage, and detects the voltage of each battery cell 1 via voltage detection line 19, connector 17, and connection line 24. In circuit board 20, the voltage of each battery cell 1 is input to terminals adjacent to each other in input terminal 23 and connecting terminal 18 disposed at positions facing each other. Therefore, as illustrated in FIG. 6, voltage detection circuit 22 detects the voltage of each battery cell 1 by connecting input terminal 23 to electrode terminal 11 of each battery cell 1 via connection line 24 of each row and voltage detection line 19 connected to electrode terminal 11 of each battery cell 1. In particular, as illustrated in FIGS. 6 and 7, connection line 24 connecting terminal 18 and input terminal 23 is provided on the surface of circuit board 20 as wiring pattern 25 that does not intersect with each other. Therefore, connecting terminal 18 and input terminal 23 can be ideally connected via the short connection line 24 while circuit board 20 is inexpensively mass-produced as a simple structure.

In electronic circuit block 6, electronic components for realizing voltage detection circuit 22 are mounted on circuit board 20. However, electronic circuit block 6 can also be mounted on circuit board 20 as a block in which all the electronic circuits including voltage detection circuit 22 are integrated circuits and the integrated circuits are embedded in a package of an insulating material.

Electronic circuit block 6 including voltage detection circuit 22 detects the voltage of battery cell 1 whose voltage fluctuates by charging and discharging, and prevents overcharge and overdischarge of each battery cell 1 with the battery voltage as a set range. In battery module 10, electronic circuit block 6 may include controlling circuit 30 that controls a charge and discharge current of battery stack 2. This controlling circuit 30 controls the charge and discharge current to prevent overcharge and overdischarge of battery cell 1. Voltage detection circuit 22 transmits voltage data of battery cell 1 to the controlling circuit 30. The electronic circuit block can transmit battery information to an externally provided controlling circuit without providing a controlling circuit, and can control a charge and discharge current of battery module with the external controlling circuit.

Voltage detection circuit 22 preferably detects the voltages of all battery cells 1. However, it is possible for voltage detection circuit 22 not to necessarily detect the voltage of all battery cells 1 but to, for example, divide battery cells 1 constituting battery stack 2 into a plurality of battery units and detect the voltage of each battery unit. The battery unit in which the plurality of battery cells are connected in parallel can detect the voltage of the battery unit and detect the voltages of all the battery cells. A battery unit in which the plurality of battery cells are connected in series detects the voltage of the battery unit and detects the total voltage of the battery cells connected in series. The battery unit in which the plurality of battery cells are connected in series includes 2 to 5 battery cells. Since this battery unit detects the voltage of the battery unit and detects the total voltage of the 2 to 5 battery cells, the voltages of the battery cells become ½ to ⅕ of the total voltage to be detected. The voltage of battery cell 1 changes depending on the remaining capacity. The voltage of battery cell 1 becomes higher than a preset maximum voltage when overcharged, and becomes lower than a minimum voltage when overdischarged. When battery cell 1 is overcharged or overdischarged, electrical characteristics are degraded and the safety also deteriorates. Voltage detection circuit 22 detects the voltage of battery cell 1 and transmits the voltage to controlling circuit 30, and controlling circuit 30 controls the charge and discharge current such that the voltage of battery cell 1 falls within a set range.

Electronic circuit block 6 is fixed to end plate 3 and dissipates heat to end plate 3. Electronic circuit block 6 includes a heat generating element such as a semiconductor element such as an FET that controls a current. Electronic circuit block 6 can reduce temperature rise by dissipating the heat energy of the heat generating element to end plate 3. The temperature rise of electronic circuit block 6 adversely affects a built-in heat generating element and the like. Since a temperature rise due to the heat generation energy of the heat generating component leads to a failure of the component, design is performed such that the entire heat generating component is enlarged or a heat generation amount is reduced so that the temperature of the heat generating component does not abnormally rise. When electronic circuit block 6 is downsized so as to enable disposition in a narrow space, a heat dissipation area is reduced, heat dissipation energy is reduced, and a temperature rise is increased. As described above, in order to dispose electronic circuit block 6 in a narrow space, downsizing is required, and in order to improve heat dissipation characteristics, it is necessary to increase the heat dissipation area and increase the size. For this reason, in electronic circuit block 6, miniaturization and improvement of heat dissipation characteristics are characteristics that are opposite to each other, and both the characteristics cannot be satisfied. A problem that miniaturization required for arrangement in a limited space and high heat dissipation characteristics are contradictory is required.

In battery module 10 in which electronic circuit block 6 is fixed to end plate 3 in a thermally coupled state and end plate 3 is used in combination with heat dissipation of electronic circuit block 6, heat generation energy of electronic circuit block 6 can be efficiently dissipated by end plate 3. In particular, end plate 3 has an extremely large heat capacity, and can reduce a temperature rise with respect to heat energy to be absorbed. Furthermore, end plate 3 has a large surface area and large heat dissipation energy from the surface, and this also reduces the temperature rise. Furthermore, in the structure for fixing end plate 3 to base plate 9, heat energy is conducted from end plate 3 to base plate 9, and the temperature rise is further reduced. In the structure in which base plate 9 is forcibly cooled or cooling plates are stacked on base plate 9, end plate 3 is forcibly cooled by base plate 9, the temperature rise is further reduced, the cooling effect of electronic circuit block 6 is further increased, and the temperature rise of electronic circuit block 6 is reduced to an ideal state.

In battery module 10 of FIGS. 1 and 4, electronic circuit block 6 is fixed to the outer surface of end plate 3. This battery module 10 has an advantage that heat generation energy of electronic circuit block 6 can be conducted to fixed end plate 3 and dissipate heat, and heat can also be dissipated from the exposed surface to the outside air to dissipate heat more efficiently. The outer shape of electronic circuit block 6 fixed to the surface of end plate 3 is smaller than the outer shape of end plate 3, and does not protrude from the outer peripheral edge of end plate 3. In this battery module 10, while electronic circuit block 6 is disposed on end plate 3, electronic circuit block 6 does not enlarge the outer shape of battery module 10, and electronic circuit block 6 can efficiently dissipate heat while being downsized.

Figure 8:
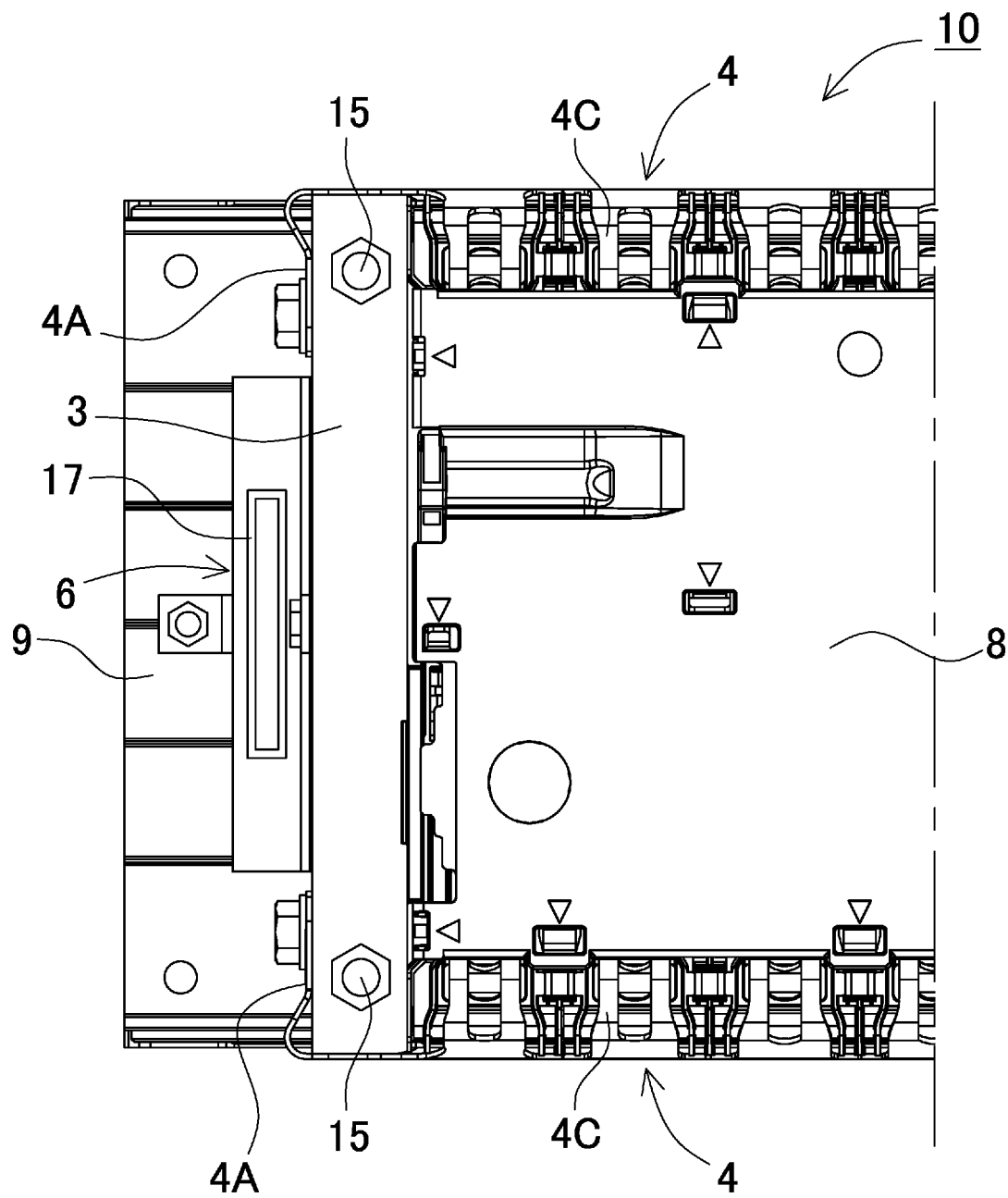
FIG. 8 is a plan view illustrating an end of the battery module illustrated in FIG. 1.

In battery module 10 of FIG. 8, the thickness of electronic circuit block 6 is set to a dimension that does not protrude from the tip edge of base plate 9 to the outer surface in plan view. In this battery module 10, while electronic circuit block 6 is fixed to end plate 3, the outer shape in plan view does not become larger than that of base plate 9, and electronic circuit block 6 can be disposed at an ideal position while being downsized as a whole.

Battery module 10 described above can be used as a power source for a vehicle that supplies electric power to a motor that causes an electric vehicle to travel. As an electric vehicle mounted with battery module 10, an electric vehicle such as a hybrid automobile or a plug-in hybrid automobile that travels by both an engine and a motor, or an electric automobile that travels only by a motor can be used, and battery module 10 is used as a power source of these vehicles. In order to provide electric power that drives the vehicle, it is preferable to mount large-capacity, high-output power supply device 100 in which a plurality of above-described battery modules 10 are connected in series or parallel and a necessary controlling circuit is added.

(Power Supply Device for Hybrid Automobile)

Figure 9:
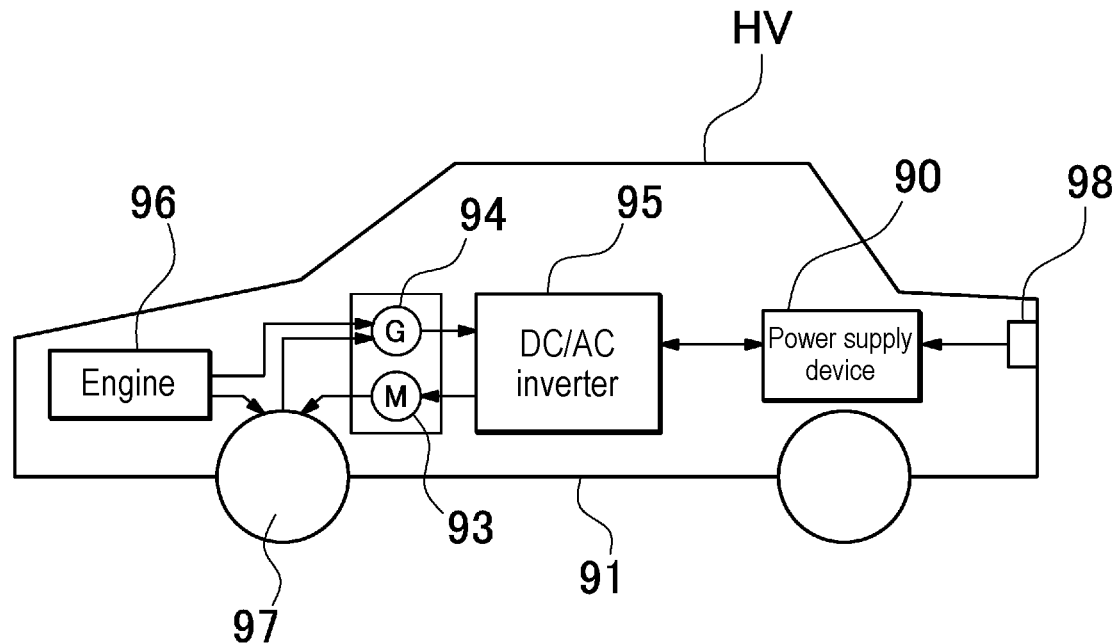
FIG. 9 is a block diagram showing an example in which a battery module is mounted on a hybrid automobile that travels by an engine and a motor.

FIG. 9 illustrates an example in which power supply device 90 connecting a plurality of battery modules is mounted on a hybrid automobile that travels by both an engine and a motor. Vehicle HV illustrated in the figure on which power supply device 90 is mounted includes: vehicle body 91; engine 96 and motor 93 for traveling that cause vehicle body 91 to travel; wheels 97 that are driven by engine 96 and motor 93 for traveling; power supply device 90 that supplies electric power to motor 93; and power generator 94 that charges a battery of power supply device 90. Power supply device 90 is connected to motor 93 and power generator 94 via DC/AC inverter 95. Vehicle HV travels by both motor 93 and engine 96 while charging and discharging the battery of power supply device 90. Motor 93 is driven in a region where engine efficiency is low, for example, during acceleration or low-speed traveling, and causes the vehicle to travel. Motor 93 is driven by electric power supplied from power supply device 90. Power generator 94 is driven by engine 96 or by regenerative braking when the vehicle is braked to charge the battery of power supply device 90. Note that, as illustrated in the drawing, vehicle HV may be provided with charging plug 98 for charging power supply device 90. Power supply device 90 can be charged by connecting charging plug 98 to an external power source.

(Power Supply Device for Electric Automobile)

Figure 10:
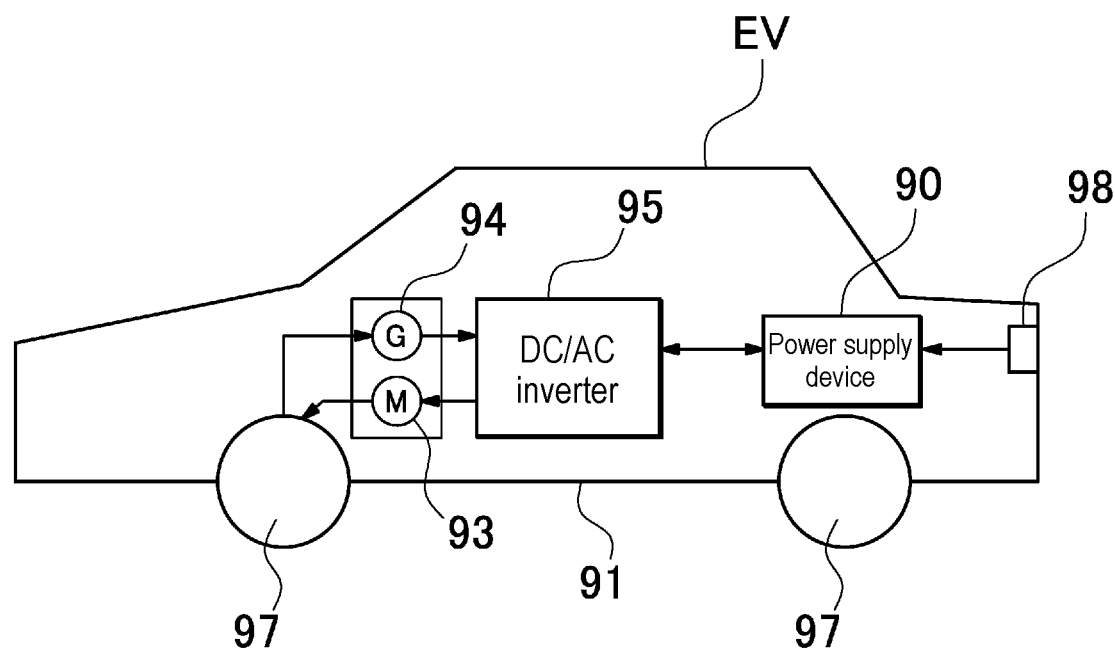
FIG. 10 is a block diagram showing an example in which a battery module is mounted on an electric automobile traveling only by a motor.

FIG. 10 illustrates an example in which power supply device 90 including a plurality of battery modules is mounted on an electric automobile traveling only by a motor. Vehicle EV illustrated in the figure on which power supply device 90 is mounted includes vehicle body 91, motor 93 for traveling that causes vehicle body 91 to travel, wheels 97 driven by motor 93, power supply device 90 that supplies electric power to motor 93, and power generator 94 that charges the battery of power supply device 90. Power supply device 90 is connected to motor 93 and power generator 94 via DC/AC inverter 95. Motor 93 is driven by electric power supplied from power supply device 90. Power generator 94 is driven by the energy at the time of applying regenerative braking to vehicle EV and charges the battery of power supply device 90. Further, vehicle EV includes charging plug 98, and power supply device 90 can be charged by connecting charging plug 98 to an external power source.

(Power Supply Device for Power Storage Device)

Figure 11:
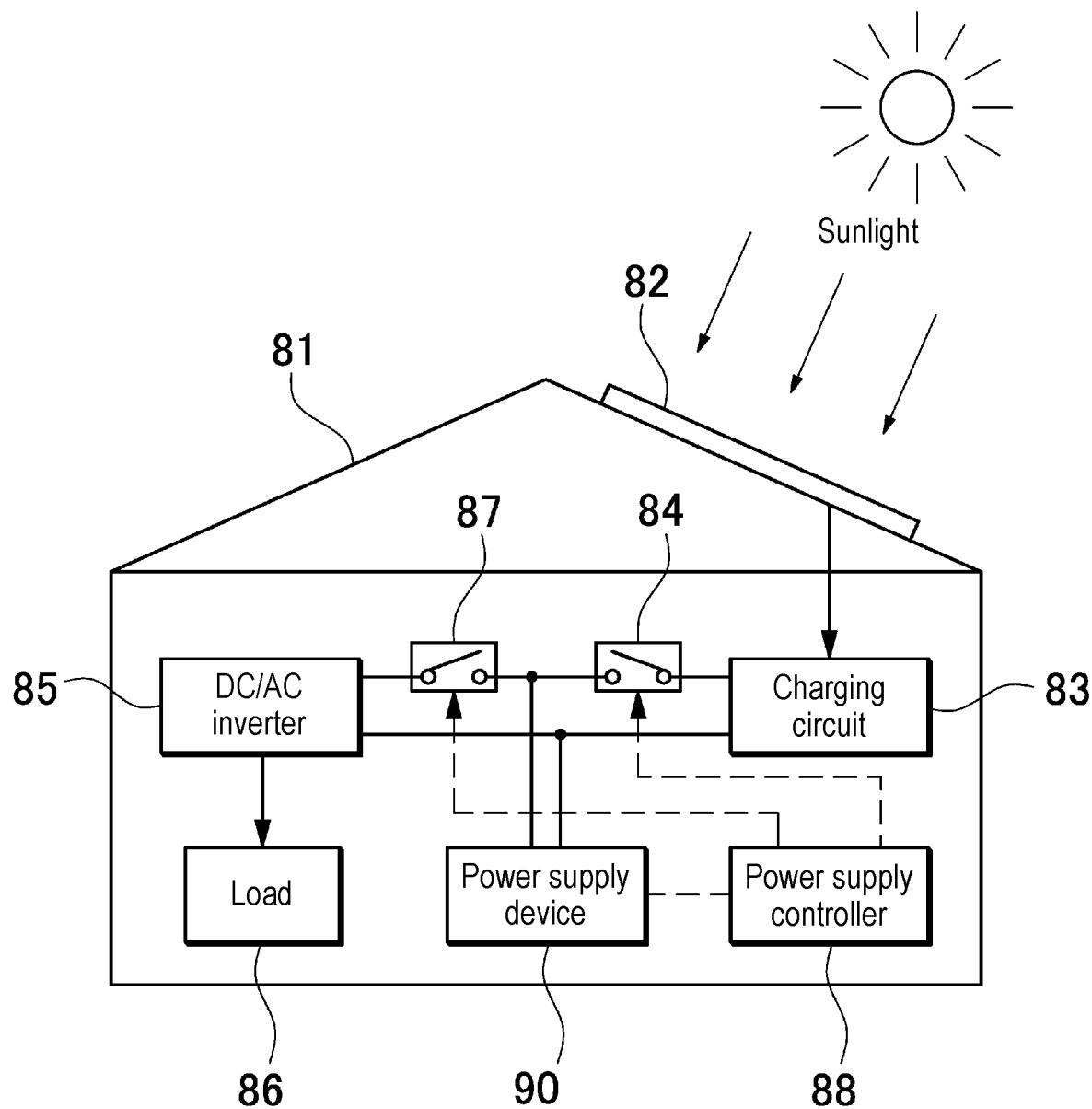
FIG. 11 is a block diagram showing an example in which a battery module is used in a power storage device.

The application of the battery module of the present invention is not limited to a power source for a motor that causes the vehicle to travel. The battery module according to the exemplary embodiment can be used as a power source for a power storage device that performs power storage by charging the battery with electric power generated by photovoltaic power generation, wind power generation, or other methods. FIG. 11 illustrates a power storage device that performs power storage by charging the battery of power supply device 90 by solar battery 82.

The power storage device illustrated in FIG. 11 charges a battery of power supply device 90 including a plurality of battery modules with electric power generated by solar battery 82 disposed on a roof, a rooftop, or the like of building 81 such as a house or a factory. The power storage device charges the battery of power supply device 90 via charging circuit 83 with solar battery 82 serving as a charging power source, and then supplies electric power to load 86 via DC/AC inverter 85. Therefore, the power storage device includes a charge mode and a discharge mode. In the power storage device illustrated in the figure, DC/AC inverter 85 is connected to power supply device 90 via discharging switch 87, and charging circuit 83 is connected to power supply device 90 via charging switch 84. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 90. Further, when charging is completed and the battery is fully charged or when the battery is in a state where a capacity of a predetermined value or more is charged, power supply controller 88 turns off charging switch 84 and turns on discharging switch 87 to switch the mode to the discharge mode and allows discharging from power supply device 90 to load 86. Furthermore, it is also possible to simultaneously supply electric power to load 86 and charge power supply device 90 by turning on charging switch 84 and turning on discharging switch 87 as necessary.

Further, although not illustrated, the power supply device can be used as a power source for a power storage device that stores electricity by charging a battery using midnight electric power at nighttime. The power supply device that is charged with midnight electric power is charged with the midnight electric power that is surplus electric power generated by a power station, and outputs the electric power during the daytime when an electric power load increases, which can limit peak electric power during the daytime to a small value. Furthermore, the power supply device can also be used as a power source charged with both an output of a solar battery and midnight electric power. This power supply device can effectively utilize both electric power generated by the solar battery and the midnight electric power, and can efficiently store power in consideration of weather and power consumption.

The power storage device as described above can be suitably used for applications such as a backup power supply device that can be mounted on a rack of a computer server, a backup power supply device for a radio base station such as a cellular phone, a power source for household or factory power storage, a power source for street lamps, and the like, a power storage device combined with a solar battery, and a backup power source for traffic lights or traffic displays for roads.

INDUSTRIAL APPLICABILITY

The battery module according to the present invention can be suitably used as a power source for a plug-in hybrid electric automobile and a hybrid electric automobile that can switch between an EV traveling mode and an HEV traveling mode, an electric automobile, and the like. In addition, this battery module and power source device can also be used as appropriate for backup power sources that can be mounted in computer server racks, backup power sources for radio base stations of cellular phones and the like, power storage power sources for homes and in factories, power sources for street lights, power storage devices combined with solar batteries, backup power sources for traffic lights, and the like.

REFERENCE MARKS IN THE DRAWINGS

1: battery cell
1a: exhaust valve
1X: terminal surface
2: battery stack
2X: terminal surface
3: end plate
4: binding bar
4A: fixing part
4B: lower coupling piece
4C: pressing piece
5: gas duct
5a: opening
6: electronic circuit block
8: upper surface cover
9: base plate
10: battery module
11: electrode terminal
12: insulating spacer
13: end surface spacer
14: bus bar
15: fixing screw
16: fixing screw
17: connector
17A: line-side connector
17B: board-side connector
18: connecting terminal
19: voltage detection line
20: circuit board
22: voltage detection circuit
23: input terminal
24: connection line
25: wiring pattern
26: electronic component
30: controlling circuit
31: output terminal
60: battery module
61: battery cell
62: battery stack
63: end plate
65: circuit board
66: electronic circuit block
71: electrode terminal
72: voltage detection circuit
73: input terminal
74: connection line
75: wiring pattern
77: connector
78: connecting terminal
79: voltage detection line
81: building
82: solar battery
83: charging circuit
84: charging switch
85: DC/AC inverter
86: load
87: discharging switch
88: power supply controller
90: power supply device
91: vehicle body
93: motor
94: power generator 95: DC/AC inverter
96: engine
97: wheel
98: charging plug
900: battery module
901: battery cell
902: battery stack
903: end plate
904: binding bar
905: gas duct
906: circuit board
910: terminal surface
911: electrode terminal
914: bus bar
HV, EV: vehicle

The invention claimed is:

1. A battery module comprising:
a battery stack including a plurality of battery cells stacked;
a pair of end plates disposed at both ends in a stacking direction of the battery stack;
a binding bar connecting the end plates;
an electronic circuit block including a voltage detection circuit that detects a voltage of each of the plurality of battery cells; and
a plurality of voltage detection lines connecting a positive electrode terminal and a negative electrode terminal of the each of the plurality of battery cells to the electronic circuit block,
wherein
the each of the plurality of battery cells includes a terminal surface arranging the positive electrode terminal and the negative electrode terminal at opposite ends,
the battery stack is obtained by stacking the plurality of battery cells with the terminal surface on the same plane,
the electronic circuit block is disposed on an outer surface of each of the end plates, and includes a circuit board on which the voltage detection circuit is mounted,
the circuit board fixes one connector linearly arranging a plurality of connecting terminals connecting the plurality of voltage detection lines,
the voltage detection circuit includes a plurality of input terminals arranged in a linear manner and each including adjacent input terminals as input terminals of a cell voltage of the each of the plurality of battery cells,
in the circuit board, the plurality of connecting terminals and the plurality of input terminals are disposed at opposing positions,
the plurality of connecting terminals and the plurality of input terminals at the opposing positions are connected by a plurality of rows of a plurality of connection lines, and
the cell voltage of the each of the plurality of battery cells is input to a corresponding one of the plurality of connecting terminals connected to a corresponding one of the plurality of input terminals by a corresponding one of the plurality of connection lines.

2. The battery module according to claim 1, wherein
a wiring pattern in which the plurality of connection lines do not intersect is provided on a surface of the circuit board, and
each of the plurality of connection lines input the cell voltage of a corresponding one of the plurality of battery cells to adjacent input terminals of the voltage detection circuit.

3. The battery module according to claim 1, wherein
the battery stack includes a terminal surface of the each of the plurality of battery cells disposed on an upper surface,
the plurality of voltage detection lines are wired on the upper surface of the battery stack, and
the connector provided on the circuit board of the electronic circuit block includes the plurality of connecting terminals arranged in a linear shape extending along an upper edge of the circuit board.

4. The battery module according to claim 3, wherein the plurality of input terminals provided in the voltage detection circuit mounted on the circuit board are arranged extending in a same direction as the plurality of connecting terminals.

5. The battery module according to claim 1, wherein the circuit board includes a wiring pattern arranging the plurality of rows of the plurality of connection lines in parallel.

6. The battery module according to claim 1, wherein
the adjacent connecting terminals of the connector are connected to the plurality of voltage detection lines connected to the positive electrode terminal and the negative electrode terminal of the each of the plurality of battery cells disposed at both ends of the terminal surface of the plurality of battery cells, and
the cell voltage of the corresponding one of the plurality of battery cells are input to the adjacent connecting terminals.

7. The battery module according to claim 6, wherein the voltage detection circuit is a circuit that detects a voltage of the adjacent input terminals as the cell voltage.

8. The battery module according to claim 1, wherein the plurality of connecting terminals of the connector are arranged in a straight line.

9. The battery module according to claim 1, wherein the plurality of input terminals of the voltage detection circuit are arranged in a straight line.

10. The battery module according to claim 1, wherein each of the plurality of voltage detection lines is a wire harness.

11. An electric vehicle including the battery module according to claim 1, the electric vehicle comprising:
the battery module;
a motor for traveling to which electric power is supplied from the battery module;
a vehicle body on which the battery module and the motor are mounted; and
wheels driven by the motor to cause the vehicle body to travel.

12. A power storage device including the battery module according to claim 1, the power storage device comprising:
the battery module; and
a power supply controller that controls charging and discharging of the battery module,
wherein the power supply controller enables charging of the plurality of battery cells with power from an outside and controls charging of the plurality of battery cells.

* * * * *